No. 886,101. PATENTED APR. 28, 1908.
H. B. WARD.
CAKE HOLDER FOR CONVEYERS.
APPLICATION FILED DEC. 17, 1907.
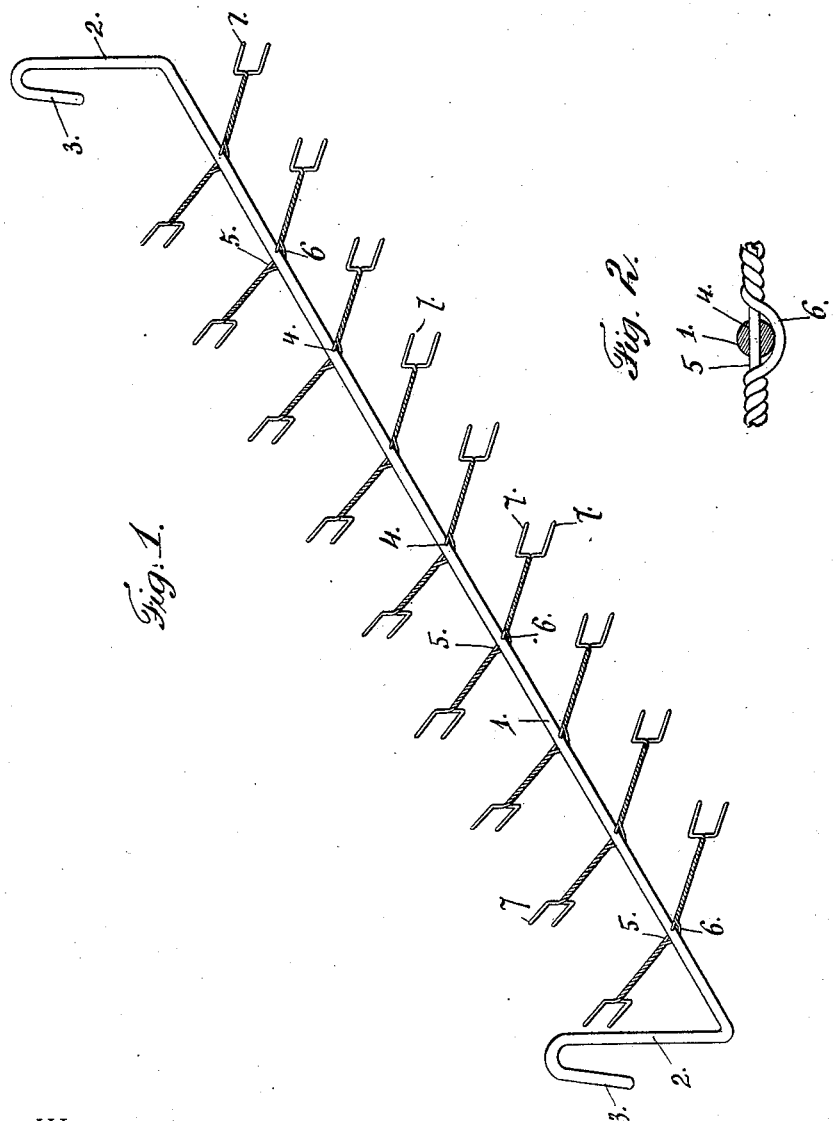
WITNESSES
A. H. Rabsag
INVENTOR
H. B. Ward.
BY
Attorneys

UNITED STATES PATENT OFFICE.

HOWARD B. WARD, OF PITTSBURG, PENNSYLVANIA.

CAKE-HOLDER FOR CONVEYERS.

No. 886,101.     Specification of Letters Patent.     Patented April 28, 1908.

Application filed December 17, 1907. Serial No. 406,876.

*To all whom it may concern:*

Be it known that I, HOWARD B. WARD, a citizen of the United States of America, residing at Pittsburg, in the county of Allegheny and State of Pennsylvania, have invented certain new and useful Improvements in Cake-Holders for Conveyers, of which the following is a specification, reference being had therein to the accompanying drawing.

This invention relates to cake holders for conveyers, and the invention has for its object to provide a novel rack for holding a plurality of cakes, wafers or crackers, in order that they can be immersed in a suitable coating solution.

Another object of this invention is to provide a simple and inexpensive cake holder particularly designed for detachably holding cakes without injuring or breaking the same.

A further object of this invention is to provide a cake holder which will be strong and durable, comparatively inexpensive to manufacture, and highly efficient for the purposes for which it is intended.

With the above and other objects in view, the invention consists in the novel construction, combination and arrangement of parts to be hereinafter more fully described and then specifically pointed out in the appended claims, and referring to the drawing forming part of this specification, like numerals of reference designate corresponding parts throughout the several views, in which:—

Figure 1 is a perspective view of my improved cake holder, Fig. 2 is a fragmentary detail sectional view of the same.

I construct my improved cake holder of a heavy piece of wire or a rod 1 having its ends bent at right angles as at 2, and further bent to provide hooks 3, whereby the holder can be suspended from two chains or a similar conveyer (not shown). The wire or rod 1 intermediate its right angular ends 2 is provided with a plurality of transverse openings 4 and passing through said openings are strands of wire 5 upon which are twisted strands of wire 6, which pass underneath the wire or rod 1. The extreme ends of the strands of wire 5 and 6 are bent to provide parallel pointed ends 7, similar to forks. The twisted strands of wire 5 and 6 are bent upwardly slightly at an angle from the horizontal plane whereby cakes can be placed in the forked or bifurcated ends of the strands of wire forming the cake holders. By placing the edges of the cakes in the forked ends, the bodies of the cakes are not injured or broken, as might occur if the cakes were stuck or otherwise placed upon the ends of the forked strands of wire.

It is apparent from the illustration of my invention that I have devised a novel holder for economically holding cakes while the same are being immersed in a suitable icing or coating solution.

I do not care to confine myself to the type of conveyer in connection with which the holder is used, or to the details of construction entering into the invention. Such other changes as are permissible by the appended claims may be resorted to without departing from the spirit and scope of the invention.

What I claim and desire to secure by Letters Patent, is:—

1. A cake holder comprising a rod having bent hook-shaped ends, said rod having a plurality of openings formed therein, strands of wire passing through said openings, strands of wire passing beneath said rod and twisted upon the first mentioned strands of wire said stands of wire having their ends bent to provide parallel arms for holding cakes.

2. A cake holder consisting of a rod having hook-shaped ends, said rod having a plurality of openings formed therein, strands of wire passed through said openings and projecting on opposite sides of said rods, and strands of wire intertwisted with the first mentioned strands and looping a portion of said rod, each of said strands of wire formed at their ends with parallel arms between which a cake is received.

In testimony whereof I affix my signature in the presence of two witnesses.

HOWARD B. WARD.

Witnesses:
   Jos. SPEICHT, Jr.,
   L. D. CARSON.